Patented July 9, 1935

2,007,727

UNITED STATES PATENT OFFICE 2,007,727

FLAVORING AND COLORING EXTRACT

Earl B. Putt, New York, N. Y.

No Drawing. Application September 21, 1931,
Serial No. 564,249

10 Claims. (Cl. 99—11)

This invention relates to a new flavoring and coloring composition and more particularly to an extract for imparting a pleasing reddish brown color and a distinctive spicy, aromatic flavor to beverages and beverage concentrates or syrups.

The principal object of this invention is to provide an improved coloring and flavoring extract from oak wood which may advantageously be used for quickly coloring and flavoring beverages and beverage concentrates.

As is well known, it has been the practice for many years to store beverages over long periods in oak barrels which had previously been charred in order to give the beverages a distinctive color and flavor, such color and flavor being imparted to the beverages by extraction in solution of colored extractives from the charred wood of the barrels. For many years this method was applied primarily to spirituous liquors, such as whiskies, but during recent years a similar method has been applied to non-intoxicating beverages and syrups and concentrates for making the same, such as gingerale and gingerale concentrate.

While the method referred to has been widely practiced and has produced satisfactory results, it has been attended by an important disadvantage, viz. an excessive period of time has been required to secure the desired coloring and flavoring. For example, it was formerly the practice to store liquors in charred oak barrels for many years to secure a product of the desired quality. Numerous attempts have been made to overcome the disadvantageous feature referred to, most of the attempts involving the treatment of beverages with finely divided charred wood or charcoal obtained from wood, such as oak.

In connection with an effort to improve and shorten the time involved in this method of flavoring and coloring beverages, particularly non-intoxicating beverages such as gingerale and gingerale concentrate which could not economically be stored over long periods, I discovered a new and distinctive flavoring composition which can be readily prepared and which will suitably color and distinctively flavor beverages in a short period of time. This new composition and the process involved in its preparation constitute the subject of the present invention.

In the practice of my process I heat oak wood over a prolonged period until the wood darkens in color, preferably to a deep brown, without burning or charring the wood. The thus heated wood is then extracted with an extracting agent, preferably a completely volatile alcohol of approximately 50 per cent. strength. This treatment extracts colored constituents from the wood which possess an aromatic odor which is distinctive and pleasing. The resulting solution is then concentrated, preferably by distilling the solution to substantial dryness. The resulting dry mass may then be used as a coloring and flavoring agent or, as is preferable, the mass may be converted to soft consistency by mixing therewith a small amount of ethylene glycol or ethyl alcohol (say of 50 per cent. strength) in case there is no objection to the use of alcohol. If desired, the new flavoring and color extract produced by my process may contain or may be mixed with an extract of unheated wood.

It is, of course, common practice to prepare hydroalcoholic extracts from unheated oak wood as a source of tannin. However, my composition differs materially from such extracts. For example, when oak wood heated as suggested above is extracted with 50 per cent. alcohol, the solution obtained is dark brown in color and when tested with ferric chloride gives a reddish brown coloration instead of a dark green coloration as in the case of hydro-alcoholic extracts prepared from unheated oak wood when tested with ferric chloride. This shows that the tannins of the oak have undergone a change during the heat process to produce modified tannins. However, the reaction is not a simple one since heating oak tannin alone under like conditions yields a product which, although also changed with respect to its reaction with ferric chloride, when dissolved in diluted alcohol lacks the aromatic taste of a solution prepared from oak wood heated in the manner suggested above. Moreover, my new extract is substantially free from unchanged or unmodified tannin as it has been substantially completely converted into new compounds by the heating operation without addition of any detannating agents such as gelatin, albumin or metallic salts. Further, although unheated oak wood may, as stated above, be extracted with a 50 per cent. alcohol-water solution, the extract concentrated to dryness by heat and the residue subjected to heat, such a product lacks the aromatic flavor of my product made from oak wood which is first heated without burning or charring and then extracted.

In the preferred practice of my process, 100 grams of oak wood in coarsely ground or shredded condition are heated in a suitable oven at a temperature of between 300° and 375° F. for approximately two hours. The wood darkens in color very gradually and the final product is a deep mahogany brown. During the final heating period a distinct aromatic, almost spicy, odor is evolved, but there is substantially no smoke or burnt odor. The time of heating may be prolonged at a lower temperature or reduced at a somewhat higher temperature, but in the latter case care must be exercised that no burning occurs.

After the wood has taken on a dark brown color it is removed from the oven and cooled to approximately atmospheric temperature. Thereupon it is extracted with 500 cc. of a 50 per cent. alcohol-water mixture according to any suitable conventional extracting method. For example, the extraction may be effected in a container under a reflux container or in a closed digester. In the latter case, the use of pressure generated up to a temperature of approximately 212° F. is advantageous. While the alcohol employed in the extracting agent may advantageously be ethyl alcohol this is not necessary since methyl alcohol or other entirely volatile alcohol which leaves no residue on evaporation may be used.

The dark brown alcoholic solution produced is filtered off from the treated wood and is concentrated by heat. In usual practice the alcoholic solution is distilled to dryness, preferably in a vacuum still to retain as much of the volatile extractives as possible. The amount of extractives obtained will depend upon the manner and apparatus in which the process is practiced. However, in the foregoing example using 100 grams of original oak wood, each 100 cc. of the alcoholic extract yielded approximately 2.2 grams of dry extract. This extract is partially soluble in hot water but is completely soluble in a 50 per cent. alcohol and water solution, either methyl or ethyl alcohol being present. A solution of 0.11 gram of the dry extract in 100 cc. of a mixture of 50 cc. of water and 50 cc. of methyl alcohol yielded a clear solution having a pleasing reddish brown color. The extract in the solid form is not soft or pasty but is actually dry in dry air. If it is desired to convert the dry extract to soft consistency this may be accomplished by heating a suitable amount (depending upon the consistency desired) of ethylene glycol or alcohol, say 50 per cent. alcohol, in the event there is no objection to the use of alcohol.

If it is desired that the composition contain oak extractives containing unchanged tannins which show a green coloration with ferric chloride, unheated oak wood may be mixed in the desired proportion with the heated oak wood before extraction with the alcohol-water mixture, or an extract of unchanged tannin from unheated oak wood may be prepared and mixed with the final product as described above. In either case the finished extract will then contain unchanged tannin along with the modified tannins extracted from the heated wood.

In the event that the extract possesses a bitter taste which may be found to be objectionable, the flavor of the extract may be improved by the addition of a minor proportion of conventional decolorizing carbon to the heated oak before extraction with the alcohol extracting agent. The amount of decolorizing carbon used may be varied as will be apparent. However, in the example set forth above where 100 grams of oak wood are heated and treated with 500 cc. of 50 per cent. alcohol-water solvent I have found it advantageous to add approximately 5 grams of the decolorizing carbon to the heated wood before extraction.

My new oak extract provides in concentrated form a means of imparting a pleasing flavor to non-alcoholic beverages such as gingerale, since the extract, preferably liquefied with ethylene glycol or alcohol, may be mixed with concentrated gingerale flavoring in the process of manufacture, or with a gingerale syrup to which carbonated water is added, or to the finished beverage.

While I have described in detail the preferred embodiment of my invention it is to be understood that the details of procedure may be variously modified without departing from the spirit of the invention or the scope of the subjoined claims.

I claim:

1. A process of the character described comprising heating subdivided portions of oak wood to a deep brown color without charring or burning, subjecting the resulting wood to the action of an extracting agent comprising a completely volatile alcohol, filtering the extracting agent and dissolved constituents from the mass treated, and distilling the separated solution to substantial dryness.

2. A process of the character described comprising heating subdivided portions of oak wood to a dark brown color without charring or burning, subjecting the resulting wood to the action of an extracting agent comprising a completely volatile alcohol, separating the extracting agent and dissolved constituents from the mass treated, distilling the separated solution to substantial dryness, and converting the dry mass to soft consistency with a liquefying agent selected from the group comprising ethyl alcohol and ethylene glycol.

3. A process of the character described comprising heating subdivided portions of oak wood at a temperature of from 300° to 375° F. for approximately two hours, cooling the thus treated wood, subjecting the cooled wood to the action of an extracting agent comprising an aqueous solution of a completely volatile alcohol, filtering off the extracting agent and dissolved constituents, and concentrating the separated solution.

4. A process of the character described comprising heating subdivided portions of oak wood at a temperature of from 300° to 375° F. for approximately two hours, cooling the thus treated wood, subjecting the cooled wood to the action of an extracting agent comprising an aqueous solution of an alcohol selected from the group consisting of ethyl alcohol and methyl alcohol, separating the extracting agent and dissolved impurities from the mass treated, and concentrating the separated solution to substantial dryness.

5. A process of the character described comprising heating subdivided portions of oak wood in an oven at a temperature of from 300° to 375° F. for approximately two hours, cooling the resulting wood, heating the cooled wood in the presence of a minor proportion of a decolorizing carbon and a major proportion of an extracting agent comprising a 50 per cent. aqueous solution of an alcohol selected from the group consisting of ethyl alcohol and methyl alcohol, filtering off the alcohol solution and extracted constituents, distilling the separated solution to substantial dryness, and converting the resulting dry mass to soft consistency with a liquefying agent selected from the group consisting of ethyl alcohol and ethylene glycol.

6. In a process of the character described the step which comprises heating subdivided portions of oak wood in an oven at a temperature between 300° and 375° F. for approximately two hours, whereby a hydro-alcoholic extract of the thus treated wood gives a reddish brown coloration with ferric chloride.

7. In a process of the character described the steps comprising heating subdivided portions of oak wood at a temperature sufficiently high to modify tannins present in the wood but below a temperature sufficiently high substantially to char or burn the wood until the tannins present are substantially completely modified, whereby a hydro-alcoholic extract of the wood gives a reddish brown coloration with ferric chloride, and thereafter subjecting the treated wood to the action of an extracting agent comprising ethyl alcohol.

8. In a process of the character described the step which comprises heating subdivided portions of oak wood at a temperature sufficiently high to modify tannins present in the wood but below a temperature sufficiently high substantially to char or burn the wood until the tannins present are substantially completely modified, whereby a hydro-alcoholic extract of the wood gives a reddish brown coloration with ferric chloride.

9. A product of the character described comprising subdivided portions of baked oak wood which is of a deep brown color, substantially uncharred and unburnt, and which contains modified tannins and is substantially free from unmodified tannins whereby a hydro-alcoholic extract of the wood gives a reddish brown coloration with ferric chloride.

10. A composition of the character described comprising a substantially dry concentrate of ethyl alcohol-soluble constituents of cooked oak wood, such wood being of a deep brown color, substantially uncharred and unburnt, and containing modified tannins and being substantially free from unmodified tannins whereby a hydro-alcoholic extract of the wood gives a reddish brown coloration with ferric chloride.

EARL B. PUTT.